United States Patent [19]

White et al.

[11] Patent Number: 4,872,726

[45] Date of Patent: Oct. 10, 1989

[54] RATCHET SEAT RECLINER WITH REMOTE RELEASE

[75] Inventors: Harry H White, Battle Creek, Mich.; Karl Ligensa, Obersontheim, Fed. Rep. of Germany

[73] Assignee: Keiper Recaro Incorporated, Battle Creek, Mich.

[21] Appl. No.: 91,299

[22] Filed: Aug. 27, 1987

Related U.S. Application Data

[63] Continuation-in-part of Ser. No. 651,911, Sep. 19, 1984, abandoned.

[51] Int. Cl.[4] .............................................. A47C 1/025
[52] U.S. Cl. ...................................... 297/367; 74/105; 297/355; 297/379; 403/114
[58] Field of Search ............... 297/366, 367, 368, 369, 297/370, 371, 372, 378, 379, 354, 355; 403/114, 115; 74/105

[56] References Cited

U.S. PATENT DOCUMENTS

| | | | |
|---|---|---|---|
| 325,352 | 9/1885 | McKay | 403/115 X |
| 778,821 | 12/1904 | Duryea | 403/115 |
| 1,664,893 | 4/1928 | Meyering | 403/115 |
| 2,336,013 | 12/1943 | Hamilton | 297/367 |
| 2,949,043 | 8/1960 | Fichter et al. | 74/105 X |
| 3,081,114 | 3/1963 | Esty | 403/114 X |
| 3,185,510 | 5/1965 | Huckins et al. | 403/114 |
| 3,398,987 | 8/1968 | Lynn et al. | 297/367 X |
| 3,602,547 | 8/1971 | Tabor | 297/379 X |
| 3,638,243 | 2/1972 | Campbell Jr. et al. | 403/115 X |
| 3,788,698 | 1/1974 | Perkins | 297/367 X |
| 3,902,757 | 9/1975 | Yoshimura | 297/367 |
| 3,931,996 | 1/1976 | Yoshimura | 297/367 X |
| 3,966,253 | 6/1976 | Berghof et al. | 297/367 |
| 3,973,288 | 8/1976 | Pickles | 297/367 X |
| 4,147,386 | 4/1979 | Stolper | 297/379 X |
| 4,223,947 | 9/1980 | Cremer | 297/367 |

FOREIGN PATENT DOCUMENTS

| | | | |
|---|---|---|---|
| 758404 | 5/1967 | Canada | 297/366 |
| 6610 | 1/1980 | European Pat. Off. | 297/367 |
| 1429439 | 1/1969 | Fed. Rep. of Germany | 297/366 |
| 2339535 | 3/1975 | Fed. Rep. of Germany | 297/366 |
| 2404216 | 8/1975 | Fed. Rep. of Germany | 297/379 |
| 1414700 | 9/1965 | France | 297/366 |

Primary Examiner—Peter A. Aschenbrenner
Assistant Examiner—Thomas A. Rendos, Jr.
Attorney, Agent, or Firm—Lloyd M. Forster

[57] ABSTRACT

Ratchet recliner for automotive vehicle seats provided with remote hand lever release feature. Lower bracket sandwich plate extensions for hand lever pivot and single plane push-pull connecting link accommodate integral assembled unit installation.

16 Claims, 4 Drawing Sheets

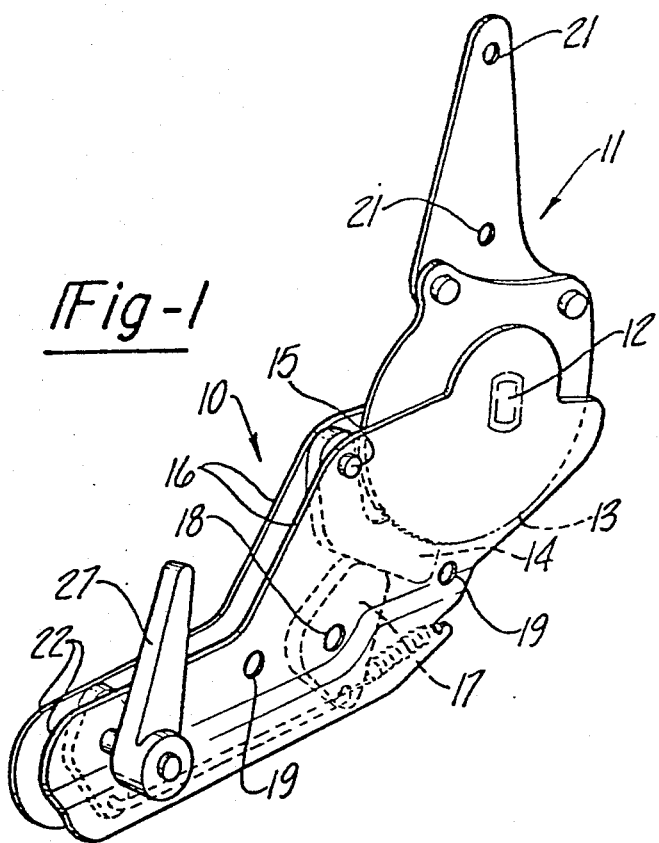
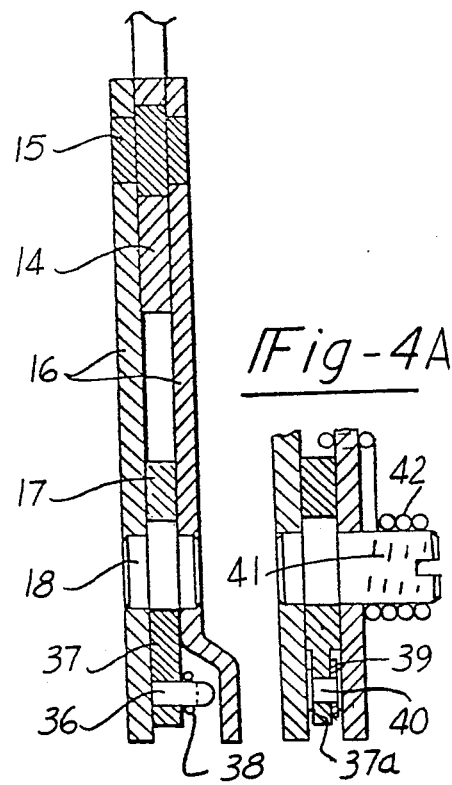
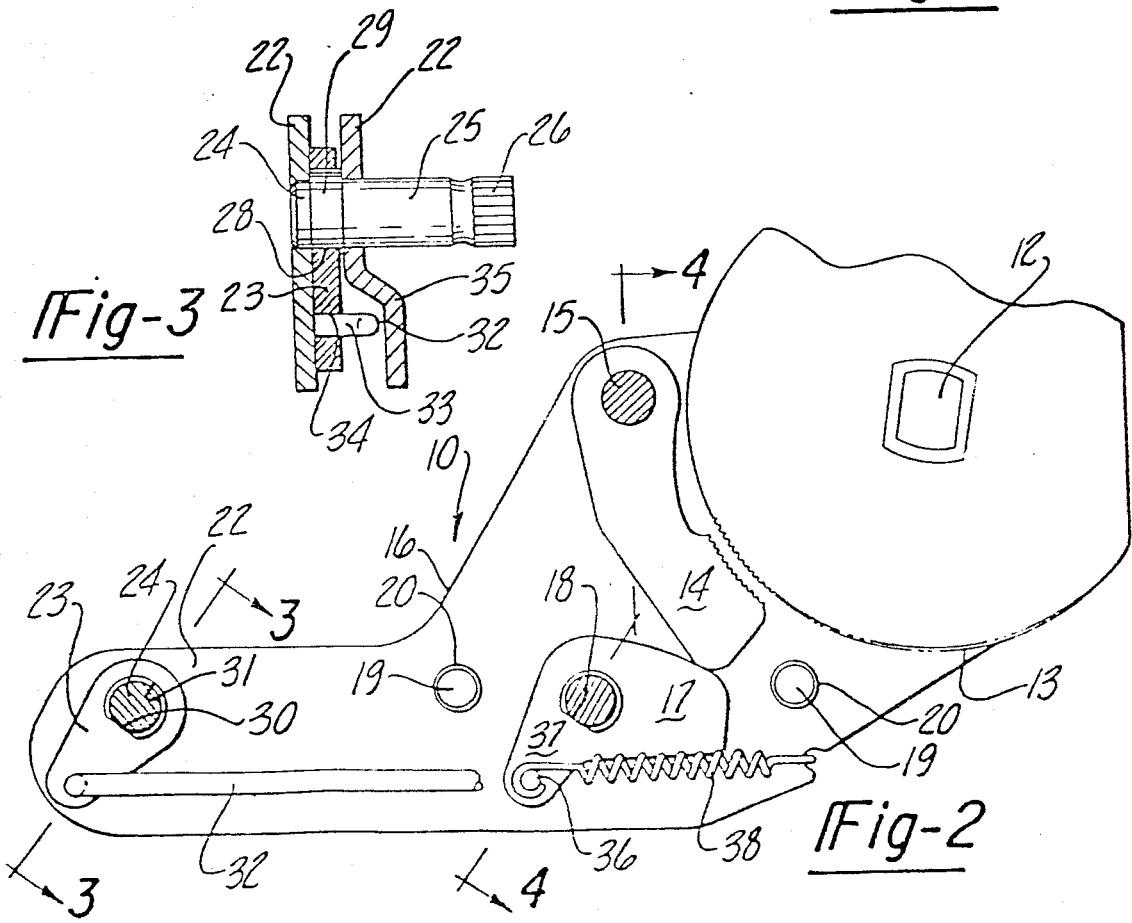

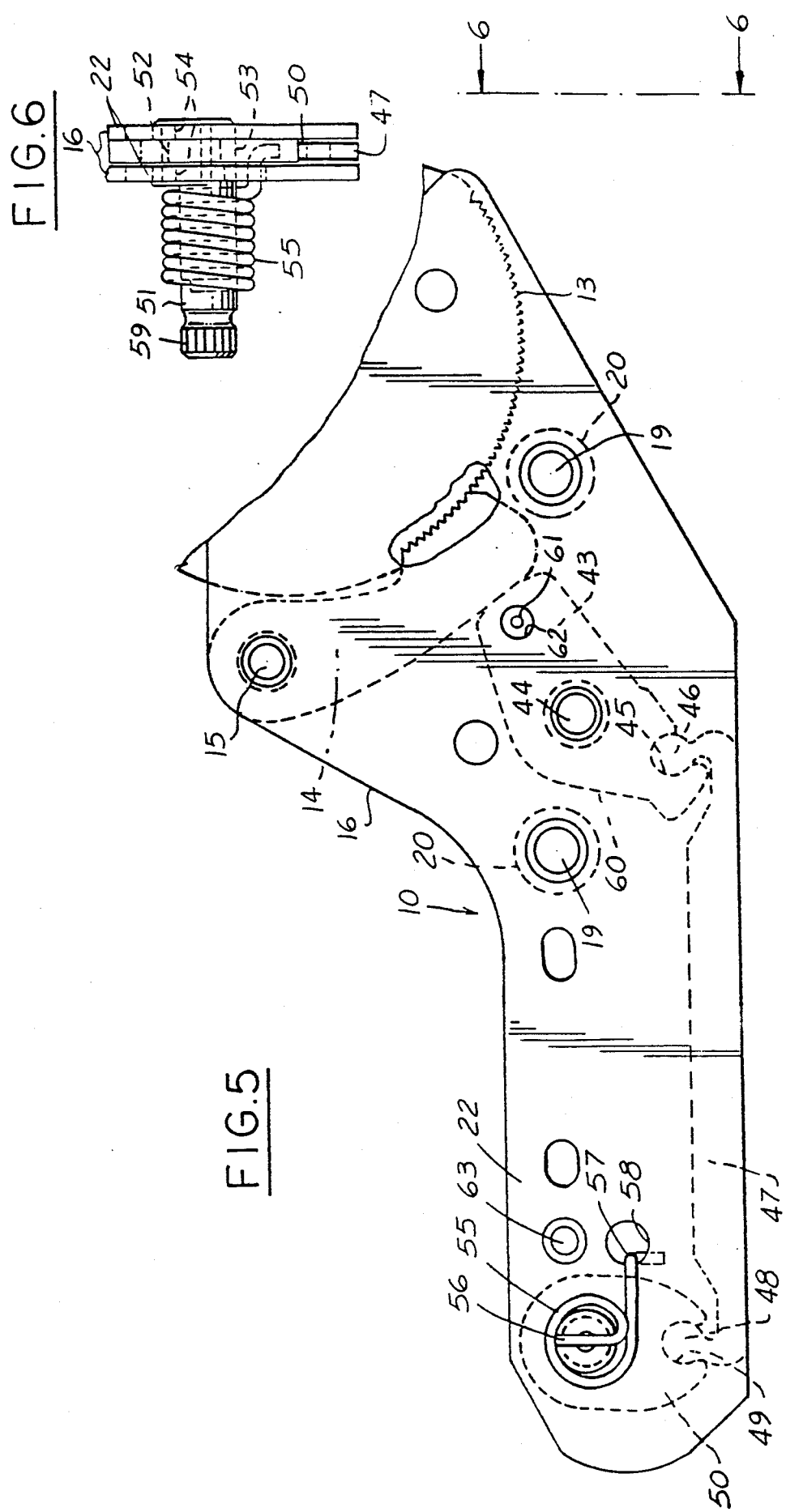

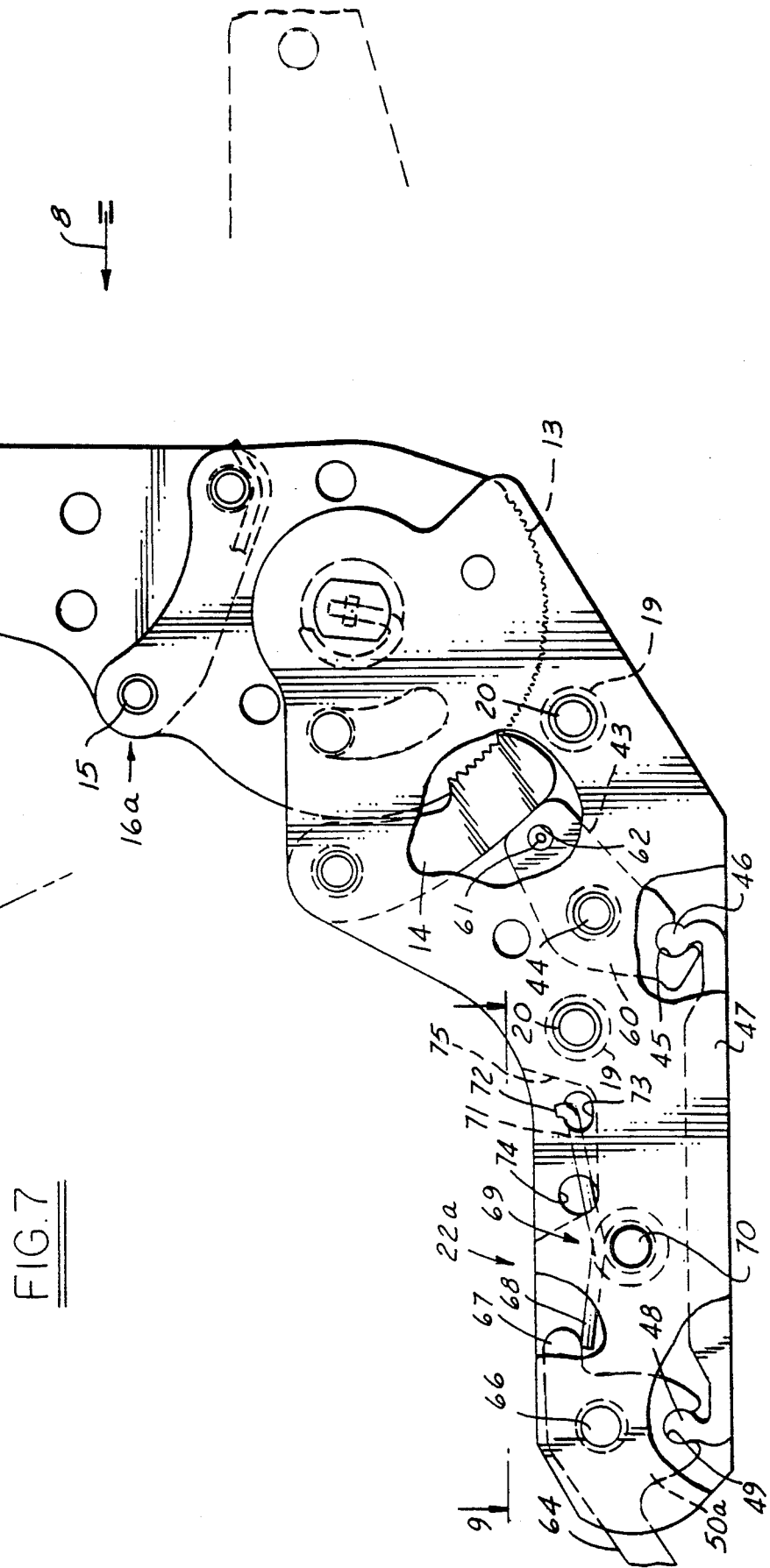

RATCHET SEAT RECLINER WITH REMOTE RELEASE

This is a continuation-in-part of co-pending application Ser. No. 651,911 filed on Sept. 19, 1984, now abandoned.

BACKGROUND OF THE INVENTION

Ratchet recliners such as disclosed in U.S. Pat. No. 4,223,947 conventionally include a pivoted cam for locking a toothed pawl in engagement with a toothed sector for any adjusted position of the seat back hinge bracket, with a hand lever provided for direct actuation of the pivoted cam. In many installations the locations of such hand lever may be inconvenient for manual actuation, particularly where located in close proximity to a seat belt attachment.

Certain prior attempts to provide a more convenient remote release lever through cable linkage, or auxiliary pivot for a manual release lever mounted on the seat frame with a connecting link to the locking cam, have required coordinated assembly provisions for the lever pivot on the seat frame and the main hinge assembly with related fabrication and tolerance problems.

BRIEF DESCRIPTION OF THE PRESENT INVENTION

In application Ser. No. 615,782, filed May 31, 1984, it was disclosed to be possible to assemble the complete recliner hinge as an integral unit to the seat and the seat back, with no additional complication than involved in the installation of a ratchet recliner hinge with directly connected release lever, by providing a bracket extension for the seat bracket having lever pivot and connecting link pre-installed and with only conventional bracket mounting holes required in the seat frame.

In one modification disclosed in the 615,782 application an undesirable offset provided in one of a pair of sandwich brackets to accommodate the connecting link formed as a rod with ends bent at right angles for pivoting connections, was eliminated by substituting a thin strip form of link having rivets at the end serving as pivots in place of the rod with bent ends. While such substitution accommodates sandwich bracket members without offset, it results in a construction wherein the connecting link is thin and too flexible to accommodate compression loads so as to require tension actuation for both cam release and cam return.

In the copending application Ser. No. 651,911 an improvement is disclosed comprising a connecting link in which pivot ends extend in the same plane as the main body of the link, which may be thick enough to function as either a compression or tension element. The cam and release lever are provided with circular arcuate pierced openings for accommodating right angle pivot knob extensions of the link for limited but adequate pivotal actuation of the locking cam through pivotal actuation of the remote release lever. The compression capacity of the link permits use of a torsion return spring on the pivotal axis of the release lever which may be overcome by manual release actuation.

BRIEF DESCRIPTION OF ADDITIONAL IMPROVEMENT

The newly disclosed release handle of the present application is constructed as an integral extension of the release lever mounted between the pair of bracket sandwich plate extensions eliminating any laterally extending stem for mounting the release handle and thereby accommodating an additional extension of the release handle position beyond the bracket extensions. A single coil release spring with projecting ends is mounted between the bracket extensions with one end engaging a knob projection of the release lever takes the place of a coiled release spring mounted on the handle stem, or similarly on a laterally projecting cam stem, in respective preferred prior embodiments. The end result is a hinge of narrower construction in the region of the bracket extensions which is simpler and less expensive to manufacture with added range of remote release handle positioning.

BRIEF DESCRIPTION OF THE DRAWINGS

FIG. 1 is a perspective view of a recliner hinge with integral bracket extensions for mounting the release handle as disclosed in the 615,782 application FIG. 2 is a side elevation of the hinge shown in FIG. 1;

FIG. 3 is a sectional view taken along the line 3—3 of FIG. 2;

FIG. 4 is a sectional view taken along the line 4—4 of FIG. 2;

FIG. 4A is a fragmentary sectional view similar to FIG. 4 showing a modified link construction;

FIG. 5 is a fragmentary side elevation illustrating the improved linkage system disclosed in copending application Ser. No. 651,911;

FIG. 6 is an end elevation taken along the line 6—6 of FIG. 5.

FIG. 7 is a side elevation of the further improved embodiment of the present application;

DESCRIPTION OF PROGRESSIVE EMBODIMENTS

Figure 9:
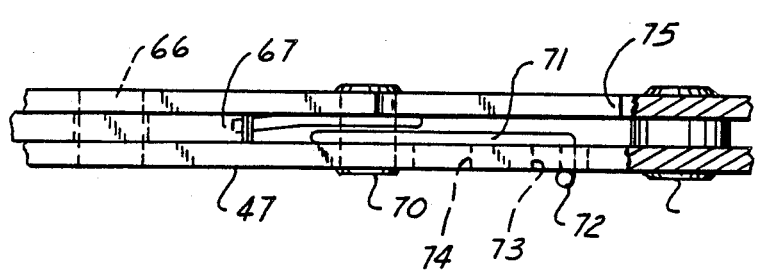
FIG. 9 is a fragmentary plan view taken along the line 9—9 of FIG. 7.

With reference to FIG. 1, seat bracket 10 is pivotally connected to seat back bracket 11 at pivot 12 with arcuate toothed sector 13 retained by toothed pawl 14 pivotally connected at 15 between sandwich seat bracket plates 16 with cam 17, pivotally mounted at 18 locking pawl 14 and seat back bracket 11 in any adjusted position as in the case of prior Pat. No. 4,223,947.

Seat bracket 10 is mounted on the seat frame through a pair of mounting holes 19 extending through sandwich plates 16 with spacers 20 therebetween while seat back bracket 11 is attached to the seat back frame through a pair of mounting holes 21.

Sandwich plates 16 are provided with extensions 22 to provide mounting for intermediate lever 23 pivotally mounted at 24 by stem 25 having splined end 26 for external release handle 27. Flat 28 provided on enlarged portion 29 of stem 25 drivingly engages matching flat 30 stamped in lever hole 31 for actuating rod 32 having end 33 formed to pivotally engage hole 34 in lever 23. One of seat back sandwich plates 16, including extension 22, is provided with offset 35 to accommodate rod link 32 having its other end 36 formed to engage bellcrank extension 37 on cam 17 normally held by tension spring 38 in cam locking engagement with pawl 14 as shown in FIG. 1 and actuated to release position as shown in FIG. 2 through remote release lever 27.

Through the provision of this construction the recliner hinge can be mounted to the seat and seat back through conventional mounting holes 19 and 21 without any special provision for the remote release handle 27 which will be retained in its normal inactive position by cam retention spring 38 connected to rod end 36.

As a modified construction which does not require the offset 35 illustrated in FIG. 3 the intermediate lever 23 and bellcrank extension 37 may be reduced in thickness at the linkage connecting pivots and a thin strip 39, preferably of spring stock, substituted for rod 32 with holes in the ends of the strip provided with rivet 40 connections to holes in the modified lever 23 and bellcrank extension 37a. This modification will permit both sandwich plates to be constructed as like flat elements. In order to accommodate such modification, pivot 18 may be extended at 41 in a manner similar to stem 25 in FIG. 3 for application of a torque spring 42 to serve in place of tension spring 38. This will permit the thin strip link 39 substituted for rod 32 to transmit all linkage force under tension and thereby avoid any buckling which might be associated with a compression load.

With reference to FIG. 5, elements previously described with reference to FIGS. 1-4 which are common, to the FIG. 5-6 embodiment include seat bracket 10, toothed sector 13, toothed pawl 14 pivotally connected at 15 between sandwich seat bracket plates 16 mounting holes 19, and sandwich plate extensions 22.

Novel elements include a different form of locking pawl 43 pivotally mounted at 44 within sandwich bracket plates 16. An extension of cam 43 has a 180° plus arcuate pivotal seat 45 opening to accept pivot knob 46 of link 47 which also has a pivot knob 48 engaging 180° plus arcuate pivot seat 49 in lever 50 drivingly connected to stem 51 pivotally mounted in side plate extensions 22. Stem 51 is provided with an enlarged cylindrical shoulder 52 having flat 53 on one side providing the driving connection with a flatted hole in lever 50. Shoulder 52 retains stem 51 between side plate extensions with bearing holes 54 in side plate extensions 22 providing the pivotal mounting for stem 51 on either side of shoulder 52. Rivet 63 is employed to retain extensions 22 in proper spaced relation relative to the pivot bearings of stem 51 and lever 50. Torque spring 55 has one end 56 engaging a slot in stem 51 and the other end 57 reacts in anchor hole 58 in one of extensions 22 with windup spring torque providing counterclockwise bias on lever 50 and compressive drive on link 47 urging cam 43 to counterclockwise engagement with pawl 14 as shown.

A handle (not shown) mountable on splined end 59 of stem 51 permits manual release actuation for lever 50 in a clockwise direction.

Link 47 is substantially equal in thickness to pawl 43 and lever 50 and adequate to transmit push-pull actuating force which make possible the seating of cam 43 under compression loading of link 47 through counterclockwise biasing of lever 50 by torque spring 55. Pivotal contact of pivot knobs 46 and 48 in respective arcuate pivot bearings 45 and 49 each exceed 180° with adequate clearance in the openings to accommodate full release of cam 43 with cam surface 60 engaging spacer 20 as a limit stop. Normal seating of the cam as shown with pawl 14 fully engaged will occur when pawl mark 61 appears in centered inspection hole 62 in one of side plates 16.

From the foregoing description it will be understood that the linkage system illustrated in FIGS. 5 and 6 provides an improvement over the bracket offset construction of FIG. 4 and thin strip link 39 of FIG. 4A; in the latter case with improvement in simplicity of link 47 construction and push-pull capacity making possible the mounting of torsion spring 55 on handle stem 51 which maintains the entire linkage under anti-rattle compressive loading.

Figure 8:
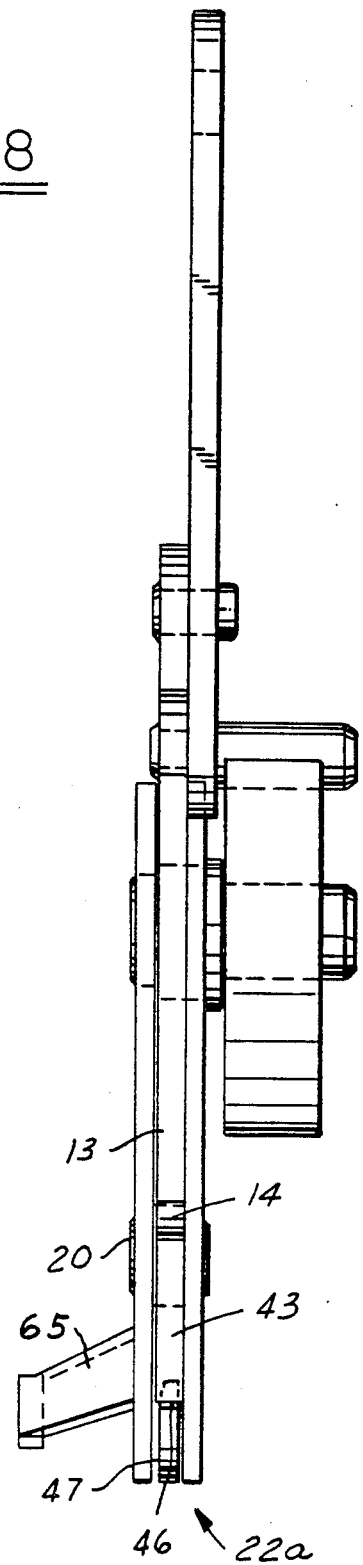
FIG. 8 is an end elevation of the FIG. 7 embodiment.

With reference to FIGS. 7-9, elements previously described with reference to FIGS. 1-6, which are common to the FIG. 7-9 embodiment include toothed sector 13, toothed pawl 14 pivotally connected at 15 between modified sandwich seat bracket plates 16a having mounting holes 20 and sandwich plate extenions 22a.

In addition, the following elements of FIGS. 7-9 are substantially identical in construction and operation to the corresponding elements of the FIG. 5-6 embodiment; Cam 43, pivot 44, pivotal seat 45, pivot knob 46, link 47, pivot knob 48, arcuate pivot seat 49, cam surface 60, pawl mark 61 and inspection hole 62. Modified release lever 50a is provided with integral handle extension 64 projecting beyond bracket plate extensions 22a and having any angle bend 65 to offset the lateral handle position which may be required.

Shouldered pin 66 serves as a simple bearing for release lever 50a and serves to retain extensions 22a in proper spaced relation in place of rivet 33 shown in the FIG. 5 embodiment.

Release lever 50a is provided with integral knob projection 67 engaged by end 68 of single coil return spring 69 mounted on shouldered rivet 70, serving also to maintain the spacing of sandwich bracket plate extensions 22a in place of rivet 63 shown in the FIG. 5 embodiment. Reaction spring extension 71 is anchored at 72 in bracket hole 73 with access hole 74 in one bracket plate extension and access recess 75 in the other serving to accommodate tools for engaging and releasing return spring 69 in assembly operations. A typical spring found to provide satisfactory operation has a closing preload from freestate of 38° in installed condition shown and a further closing working range of 34° for accommodating handle release actuation. A fraction of free coil equal to 308° 45' arc is employed using 0.091" dia. ASTM A228 music wire stressed approximately 276,000 PSI.

We claim:

1. Ratchet recliner seat hinge assembly having a pair of sandwich seat bracket plates pivotally connected to a toothed sector of a seat back bracket retained in adjusted position by a toothed pawl pivotally mounted between said plates and locked in retaining position by a cam pivotally mounted between said plates, said cam having flat bellcrank extension means, said seat bracket plates having integral remote release lever mounting extension means, intermediate flat release lever means pivotally mounted between the ends of said lever mounting extension means, said pivotal mounting including lever drive connection and external stem, manually actuated lever means having drive connection to said external stem, and linkage connecting means between said bellcrank extension means and intermediate release lever means for transmitting release actuation from said manual lever means to said cam bellcrank extension means, said linkage connecting means being characterized by a flat unitary link formed from substantially flat stock having substantial thickness capable of transmitting push-pull actuating forces extending between said sandwich bracket extension means in a common plane with said cam bellcrank extension means and intermediate release lever means, said flat link having flat arcuate pivot knob extensions engaging circular arcuate, pivot seats in said respective bellcrank extension and said intermediate release lever means, thereby providing a composite flat single layer linkage connecting means between said bellcrank extension means and intermediate release lever means all fitting in co-planar relation between said bracket plates with integral extension means.

2. The assembly of claim 1 wherein each of said pivot seats in said respective bellcrank extension and release lever means exceeds 180° of pivot bearing surface with an opening for lateral assembly with said link pivot knob extensions, and providing limited pivotal clearance sufficient to accommodate release actuation of said cam means.

3. The assembly of claim 2 wherein said pivot knob means extend respectively at substantially right angles to the major linear extension of said link.

4. The assembly of claim 3 wherein the width of said link is relieved near said pivot knobs to accommodate adjacent extremities of said bellcrank extension and release lever means.

5. The assembly of claim 4 including torque spring means mounted on said external stem to impart a normal compressive load on said link to actuate said cam in an engaging direction.

6. Ratchet recliner seat hinge assembly having a pair of sandwich seat bracket plates pivotally connected to a toothed sector of a seat back bracket retained in adjusted position of a toothed pawl pivotally mounted between said plates and locked in retaining position by a cam pivotally mounted between said plates, said cam having flat bellcrank extension means, said seat bracket plates having integral remote release lever mounting extension means, intermediate flat release lever means pivotally mounted between the ends of said lever mounting extension means, said lever means having a handle extension projecting beyond said seat bracket plates extension means, linkage connection means between said bellcrank extension means and intermediate release lever means for transmitting release actuation from said release lever means to said bellcrank extension means, and resilient means urging said cam toward said pawl retaining position, said linkage connecting means being characterized by a flat unitary link formed from substantially flat stock having substantial thickness capable of transmitting push-pull actuating forces extending between said sandwich bracket extension means in a common plane with said cam bellcrank extension means and intermediate release lever means, said flat link having flat acruate pivot knob extensions engaging circular arcuate pivot seats in said respective bellcrank extension and said intermediate release lever means, thereby providing a composite flat single lever linkage connecting means between said bellcrank extension means and intermediate release lever means all fitting in co-planar relation between said bracket plates with integral extension means.

7. The assembly of claim 6 wherein said lever means has a spring engageable projection within said seat bracket plates extension means, and spring means comprising said resilient means mounted internally between said seat bracket plates extension means engaging said spring engageable projection.

8. The assembly of claim 7 wherein said spring means comprises a single coil mounted on a transverse pin extending between said seat bracket plates extension means, and having one end extension engaging said spring engageable projection and the other end reacting on one of said seat bracket plate extension means.

9. The assembly of claim 8 wherein said coil is installed with a contracting preload in the order of 38°.

10. The assembly of claim 9 wherein said coil has a further contracting working range in the order of 34°.

11. The assembly of claim 8 wherein said one seat bracket plate extension means includes an aperture for anchoring the reaction end of said spring and an access aperture adjacent thereto.

12. The assembly of claim 11 wherein the other of said seat bracket plate extension means is provided with an access recess opposite said respective apertures.

13. The assembly of claim 6 wherein each of said pivot seats in said respective bellcrank extension and release lever means extends 180° of pivot bearing surface with an opening for lateral assembly with said link pivot knob extensions, and providing limited pivotal clearance sufficient to accommodate release actuation of said cam means.

14. The assembly of claim 13 wherein said pivot knob means extend respectively at substantially right angles to the major linear extension of said link.

15. The assembly of claim 14 wherein the width of said link is relieved near said pivot knobs to accommodate adjacent extremities of said bellcrank extension and release lever means.

16. The assembly of claim 15 wherein said spring means is adapted to inpart a normal compressive load on said link to actuate said cam in an engaging direction.

* * * * *